United States Patent
Pope et al.

(10) Patent No.: US 7,844,782 B2
(45) Date of Patent: Nov. 30, 2010

(54) DATA PROCESSING SYSTEM WITH MEMORY ACCESS

(75) Inventors: Steven Leslie Pope, Cambridge (GB); David James Riddoch, Cambridge (GB); Greg Law, Cambridge (GB)

(73) Assignee: Solarflare Communications, Inc., Irvine, CA (US)

(*) Notice: Subject to any disclaimer, the term of this patent is extended or adjusted under 35 U.S.C. 154(b) by 356 days.

(21) Appl. No.: 11/982,108

(22) Filed: Oct. 31, 2007

(65) Prior Publication Data
US 2008/0065838 A1   Mar. 13, 2008

Related U.S. Application Data

(62) Division of application No. 11/900,377, filed on Sep. 10, 2007.

(51) Int. Cl.
G06F 12/00 (2006.01)
(52) U.S. Cl. .......... 711/150; 711/147; 711/152; 711/163
(58) Field of Classification Search .......... 711/147, 711/148, 150, 151, 152, 163
See application file for complete search history.

(56) References Cited

U.S. PATENT DOCUMENTS

| | | | |
|---|---|---|---|
| 5,535,416 | A | 7/1996 | Feeney et al. |
| 6,424,621 | B1 | 7/2002 | Ramaswamy et al. |
| 6,484,224 | B1 | 11/2002 | Robins et al. |
| 6,560,613 | B1 | 5/2003 | Gylfason et al. |
| 6,687,762 | B1 | 2/2004 | Van Gaasbeck et al. |
| 6,785,888 | B1 | 8/2004 | McKenney et al. |
| 7,447,861 | B2 * | 11/2008 | Burka .......... 711/164 |
| 2003/0182465 | A1 | 9/2003 | Moir et al. |
| 2004/0210906 | A1 | 10/2004 | Beresnevichiene et al. |
| 2006/0015700 | A1 * | 1/2006 | Burka .......... 711/163 |
| 2007/0118700 | A1 * | 5/2007 | Mensching et al. .......... 711/147 |
| 2007/0124545 | A1 * | 5/2007 | Blanchard et al. .......... 711/152 |

FOREIGN PATENT DOCUMENTS

EP   0 598 510   5/1994

OTHER PUBLICATIONS

Marc E. Fiuczynski, et al. "Spine Reports, Talks, Papers", http://www.cs.princeton.edu/~mef/research/spine/reports/sigops98/index.html, May 19, 2006, 10 pages.

(Continued)

*Primary Examiner*—Jack A Lane
(74) *Attorney, Agent, or Firm*—Weide & Miler, Ltd.

(57) ABSTRACT

A data processing system with memory access comprising an operating system for supporting processes, such that the process are associated with one or more resources and the operating system being arranged to police the accessing by processes of resources so as to inhibit a process from accessing resources with which it is not associated. Part of this system is an interface for interfacing between each process and the operating system and a memory for storing state information for at least one process. The interface may be arranged to analyze instructions from the processes to the operating system, and upon detecting an instruction to re-initialize a process cause state information corresponding to that pre-existing state information to be stored in the memory as state information for the re-initialized process and to be associated with the resource.

16 Claims, 2 Drawing Sheets

OTHER PUBLICATIONS

Hermann Hellwagner, Josef Weidendorfer, "SCI Sockets Library", http://www.itec.uni-klu.ac.at/, http://wwwbodes.in.tum.de/, 20.
Kevin Fall, et al., "Improving Continuous-Media Playback Performance with In-Kernel Data Paths", 0-8186-5530-5/94, © 1994 IEEE, pp. 100-109.
Maged M. Michael, et al., "Relative Performance of Preemption-Safe Locking and Non-Blocking Synchronization on Multiprogramm3ed Shared Memory Multiprocessors", 1063-7133/97, © 1997 IEEE, pp. 267-273.
Maged M. Michael, "Hazard Pointers: Safe Memory Reclamation for Lock-Free Objects", IEEE Transactions on Parallel and Distributed Systems, vol. 15, No. 6, Jun. 2004, pp. 491-504.
"HP-UX Route Administration Manager (ramD)" ©2003 Hewlett-Packard Development Company L.P., 11 pages.
Tom Zanussi, et al., "relayfs: An Efficient Unified Approach for Transmitting Data from Kernel to User Space", Linux Symposium 2003, pp. 519-532.
Cramming more components onto integrated circuits, Electronics, vol. 38, No. 8, pp. 114-117, 1965, Gordon E. Moore, Apr. 19, 1965.
Programming Semantics for Multiprogrammed Computations, Communications of the ACM, vol. 9, No. 3, pp. 143-155, Jack B. Dennis and Earl C. Van Horn, Mar. 1966.
The Aloha System, ACM Computer Communication Review, vol. 4 No. 1, F.F. Kuo, Jan. 1974.
A Protocol for Packet Network Intercommunication, IEEE Transactions on Communications, vol. COM-22, No. 5, pp. 637-648, Vinton Cerf, Robert Kahn, May 1974.
Proposal for an International End-to-End Protocol, ACM Computer Communication Review, vol. 6 No. 1, p. 1-18, V. Cerf, et al., Jan. 1976.
Ethernet: distributed packet switching for local computer networks, Communications of the ACM, vol. 19, Issue 7, pp. 395-404, Robert M. Metcalfe and David R. Boggs, Jul. 1976.
Interrupt Driven Programming, Communications of the ACM, vol. 14, No. 6, p. 417-418, Marvin Zelkowits, Jun. 1971.
Synchronizing Processors with Memory-Content-Generated Interrupts, Communications of the ACM, vol. 16, No. 6, p. 350-351, J. Carver Hill, Jun. 1973.
Virtual cut-through: A new computer communication switching technique, Computer Networks, vol. 3, No. 4, pp. 267-286, P. Kermani and L. Kleinrock, Sep. 1979.
An Overview of the New Routing Algorithm for the ARPANET, Proceedings of the 6th Data Communications Symposium, p. 63, John M. McQuillan, et al., Nov. 1979.
Grapevine: An Exercise in Distributed Computing, Communications of the ACM, vol. 25, Issue 4, pp. 260-274, Andrew D. Birrell, et al., Apr. 1982.
The Architecture of the Universe Network, ACM Computer Communication Review, vol. 14, No. 2, pp. 2-9, Ian M. Leslie, et al., Jun. 1984.
Congestion Control in IP/TCP Internetworks, ACM Computer Communication Review, vol. 14, No. 4, p. 11-17, John Nagle, Oct. 1984.
Development of a TCP/IP for the IBM/370, ACM Computer Communication Review, vol. 15, No. 4, Robert M. Brandriff, et al., Sep. 1985.
Supercomputers on the Internet: A Case Study, ACM Computer Communication Review, vol. 17, No. 5, C. Kline, Aug. 1987.
Fragmentation Considered Harmful, ACM Computer Communication Review, vol. 17, No. 5, pp. 390-401, Christopher A. Kent, Jeffrey C. Mogul, Oct. 1987.
An Analysis of Memnet: An Experiment in High-Speed Shared-Memory Local Networking, ACM Computer Communication Review, vol. 18, No. 4, p. 165-174, Gary S. Delp, et al., Aug. 1988.
Measured Capacity of an Ethernet: Myths and Reality, ACM Computer Communication Review, vol. 18, No. 4, p. 222-234, David R. Boggs, et al., Aug. 1988.
The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.
Congestion Avoidance and Control, ACM Computer Communication Review, vol. 18, No. 4, p. 314-329, V. Jacobson, Aug. 1988.
The Design Philosophy of the DARPA Internet Protocols, ACM Computer Communication Review, vol. 18, No. 4, pp. 106-114, David D. Clark, Aug. 1988.
Development of the Domain Name System, ACM Computer Communication Review, vol. 18, No. 4, pp. 123-133, Paul V. Mockapetris and Kevin J. Dunlap, Aug. 1988.
Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.
Implementing TCP/IP on a Cray computer, ACM Computer Communication Review, vol. 19, No. 2, p. 11-15, David A. Borman, Apr. 1989.
Computing the Internet Checksum, ACM Computer Communication Review, vol. 19, No. 2, p. 86-94, R. Braden, et al., Apr. 1989.
An Analysis of TCP Processing Overhead, IEEE Communications Magazine, vol. 27, No. 6, pp. 23-29, David D. Clark, et al., Jun. 1989.
Sirpent: A High-Performance Internetworking Approach, ACM Computer Communication Review, vol. 19, No. 4, p. 158-169, David R. Cheriton, Sep. 1989.
Protocol Design for High Speed Networks, PhD Thesis, University of Cambridge, Derek Robert McAuley, Sep. 1989.
How Slow Is One Gigabit Per Second?, ACM Computer Communication Review, vol. 20, No. 1, p. 44-53, Craig Partridge, Jan. 1990.
Architectural Considerations for a New Generation of Protocols, ACM Computer Communication Review, vol. 20, No. 4, pp. 200-208, D. D. Clark and D. L. Tennenhouse, Sep. 1990.
Protocol Implementation on the Nectar Communication Processor, ACM Computer Communication Review, vol. 20, No. 4, p. 135-144, Eric C. Cooper, et al., Sep. 1990.
A Host-Network Interface Architecture for ATM, ACM Computer Communication Review, vol. 21, No. 4, Bruce S. Davie, Sep. 1991.
A High-Performance Host Interface for ATM Networks, ACM Computer Communication Review, vol. 21, No. 4, p. 317-325, C. Brendan S. Traw, Sep. 1991.
Fairisle: An ATM Network for the Local Area, ACM Computer Communication Review, vol. 21, No. 4, p. 327, Ian Leslie and Derek R. McAuley, Sep. 1991.
The Desk Area Network, ACM Operating Systems Review, vol. 25, Issue 4, p. 14-21, Mark Hayter and Derek McAuley, Oct. 1991.
An Integration of Network Communication with Workstation Architecture, ACM Computer Communication Review, vol. 21, No. 5, p. 18-29, 1991.
The Evolution of XTP, Proceedings of the Third International Conference on High Speed Networking,. Greg Chesson. Nov. 1991.
System support for multi-service traffic, University of Cambridge Computer Laboratory Technical Report No. 245, Michael J. Dixon, Jan. 1992.
Atomic: A Local Communication Network Created Through Repeated Application of Multicomputing Components, Made available by authors, Danny Cohen, Gregory Finn, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.

Giving Applications Access to Gb/s Networking, IEEE Network, vol. 7, Issue 4, pp. 44-52, Jonathan M. Smith and C. Brendan S. Traw, Jul. 1993.
The Design and Evaluation of an Off-Host Communications Protocol Architecture, MSci Thesis, University of Virginia, Jeffrey R. Michel, Aug. 1993.
A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
Atomic: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 8-17, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of a Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing A High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Devices in a Multi-Service Operating System, PhD Thesis, University of Cambridge, Paul Ronald Barham, Jul. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: A Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.

Characterizing Processor Architectures for Programmable Network Interfaces, Proceedings of the 14th international conference on Supercomputing, pp. 54-65, Santa Fe, New Mexico, Patrick Crowley, et al., May 8, 2000.

When The CRC and TCP Checksum Disagree, ACM Computer Communication Review, vol. 30, No. 4, pp. 309-319, Jonathan Stone and Craig Partridge, Oct. 2000.

The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.

Architectural and Performance Evaluation of GigaNet and Myrinet Interconnects on Clusters of Small-Scale SMP Servers, Proceedings Dallas, Texas, Jenwei Hsieh, et al., Nov. 4, 2000.

Arsenic: A User-Accessible Gigabit Ethernet Interface, Proceedings of IEEE Infocom 2001, pp. 67-76, Ian Pratt and Keir Fraser, Apr. 22, 2001.

Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.

Presentation given at HOTI'01, 9th Symposium on High Performance Interconnects, Bilic Hrvoye, et al., Aug. 22, 2001.

Topology Discovery for Large Ethernet Networks, ACM Computer Communication Review, vol. 31, No. 4, Bruce Lowekamp, et al., Oct. 2001.

EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.

A Case Study in Application I/O on Linux Clusters, Proceedings of the 2001 ACM/IEEE conference on Supercomputing, pp. 11, Denver, Robert Ross, et al., Nov. 10, 2001.

On Making TCP More Robust to Packet Reordering, ACM Computer Communication Review, vol. 32, No. 1, E. Blanton and M. Allman, Jan. 2002.

TCP Servers: Offloading TCP Processing in Internet Servers. Design, Implementation, and Performance, Technical Report DCR-TR-481, Computer Science Department, Rutgers University, Murali Rangarajan, et al., Mar. 2002.

ATM: A Retrospective on Systems Legacy, ACM Computer Communication Review, vol. 32, No. 5, Jon Crowcroft and Derek McAuley, Nov. 2002.

A Retrospective View of ATM, ACM Computer Communication Review, vol. 32, No. 5, pp. 13-19, Charles Kalmanek, Nov. 2002.

The Influence of ATM on Operating Systems, ACM Computer Communication Review, vol. 32, No. 5, pp. 29-37, Jonathan Smith, Nov. 2002.

An Overview of the BlueGene/L Supercomputer, Proceedings of the 2002 ACM/IEEE conference on Supercomputing, pp. 1-22, Baltimore, NR Adiga, et al., Nov. 16, 2002.

Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.

Some Internet Architectural Guidelines and Philosophy, IETF Network Working Group, Request for Comments: 3439, R. Bush, D. Meyer, Dec. 2002.

F-RTO: An Enhanced Recovery Algorithm for TCP Retransmission Timeouts, ACM Computer Communication Review, vol. 33, No. 2, Pasi Sarolahti, et al., Apr. 2003.

Scalable TCP: Improving Performance in Highspeed Wide Area Networks, ACM Computer Communication Review, vol. 33, No. 2, pp. 83-91, Tom Kelly, Apr. 2003.

TCP offload is a dumb idea whose time has come, Proceedings of HotOS IX: The 9th Workshop on Hot Topics in Operating Systems, pp. 25-30, Jeffrey C. Mogul, May 18, 2003.

A case for Virtual Channel Processors, Proceedings of the ACM SIGCOMM 2003 Workshops, Derek McAuley and Rolf Neugebauer, Aug. 2003.

Initial End-to-End Performance Evaluation of 10-Gigabit Ethernet, Proceedings of the 11th Symposium on High Performance Interconnects, Justin Hurwitz and Wu-chun Feng, Aug. 20, 2003.

Workshop on network-I/O convergence: experience, lessons, implications (NICELI), ACM Computer Communication Review, vol. 33, No. 5, Vinay Aggarwal, et al., Oct. 2003.

Optimizing 10-Gigabit Ethernet for Networks of Workstations, Clusters, and Grids: A Case Study, Proceedings of the 2003 ACM/IEEE conference on Supercomputing, Phoenix, Arizona, Wu-chun Feng, et al., Nov. 15, 2003.

Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.

Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.

FAST TCP: Motivation, Architecture, Algorithms, Performance, Proceedings of IEEE Infocom, pp. 1246-1259, Cheng Jin, et al., Mar. 7, 2004.

TCP Offload to the Rescue, ACM Queue, vol. 2, No. 3, Andy Currid, May 1, 2004.

TCP Onloading for Data Center Servers, Computer, IEEE Computer Society, vol. 37, No. 11, pp. 48-58, Greg Regnier, et al., Nov. 2004.

Declaration of Dr Gregory L Chesson in Alacritech v. Microsoft, United States District Court, Northern District California, San Francisco Division, Gregory L. Chesson, Feb. 4, 2005.

Computing Research: A Looming Crisis, ACM Computer Communication Review, vol. 35, No. 2, Edward D. Lazowska and David A. Patterson, Jul. 2005.

Performance Characterization of a 10-Gigabit Ethernet TOE, Proceedings of the 13th Symposium on High Performance Interconnects, W. Feng, et al., Aug. 17, 2005.

User-level device drivers: Achieved performance, J. Comput. Sci. & Technol., vol. 20, B. Leslie, et al., Sep. 2005.

Head-to-TOE Evaluation of High-Performance Sockets Over Protocol Offload Engines, Proceedings of the IEEE International Conference on Cluster Computing, P. Balaji, et al., Sep. 2005.

SCTP versus TCP for MPI, Proceedings of the 2005 ACM/IEEE conference on Supercomputing, Seattle, p. 30, Washington, Humaira Kamal, et al., Nov. 12, 2005.

LTCP: Improving the Performance of TCP in Highspeed Networks, ACM Computer Communication Review, vol. 36, No. 1, pp. 41-50, Sumitha Bhandarkar, et al., Jan. 2006.

Zero-Copy TCP in Solaris, Proceedings of the USENIX Annual Technical Conference, H. K. Jerry Chu, Jan. 1996.

Reflections on Network Architecture: An Active Networking Perspective, ACM Computer Communication Review, vol. 36, No. 2, pp. 27-30, Ken Calvert, Apr. 2006.

10 Networking Papers: Recommended Reading, ACM Computer Communication Review, vol. 36, No. 2, pp. 51-52, Jon Crowcroft, Apr. 2006.

Flow labelled IP over ATM: design and rationale, ACM Computer Communication Review, vol. 36, No. 3, pp. 79-92, Greg Minshall, et al., Jul. 2006.

10 Networking Papers: Readings for Protocol Design, ACM Computer Communication Review, vol. 36, No. 3, pp. 77-78, David Wetherall, Jul. 2006.

A Critique of RDMA, HPCWire article: http://www.hpcwire.com/features/17886984.html, Patrick Geoffray, Aug. 18, 2006.

The NE010 iWARP Adapter, Open Fabrics Alliance, Gary Montry, May 2006.

Protocol Onload vs. Offload, Intel, Greg Regnier, Date Unknown.

Protocol Onloading vs. Offloading in High Performance Networks, Pacific Northwest Laboratories by Batelle for the U.S. Department of Energy, Fabrizio Petrini, Date Unknown.

Thoughts about TCP Offloading, My 2003 HotOS paper title: TCP Offload is a dumd idea whose time has to come, HP Labs (Not speaking for HP), Jeff Mogul, Aug. 2006.

Protocol Offloading vs. Onloading in High Performance Networks, Hot Interconnect Panel, System Interconnect Group, Qlogic Corporation, Lloyd Dickman CTO, Aug. 23, 2006.

Protocol off-loading vs. on-loading in high performance networks, Hot Interconnects, Myricom®, Patrick Geoffray, 2006.

Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.

High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.

10Gb/s Ethernet Performance and Retrospective, ACM Computer Communication Review, vol. 37, No. 2, pp. 89-92, Steven Pope and David Riddoch, Mar. 19, 2007.

Getting 10 Gb/s from Xen, Euro-Par Conference 2007, pp. 224-233, Rennes, France, Kieran Mansley, et al., Aug. 28, 2007.

The Parallel Protocol Engine, IEEE/ACM Transactions in Networking vol. 1, Issue 6, pp. 650-663, M. Kaiserswerth, Dec. 1993.

Use of message-based multicomputer components to construct gigabit networks, ACM Computer Communication Review, vol. 23, No. 4, p. 32-44, Danny Cohen, et al., Jul. 1993.

The End of History, IEEE TCGN Gigabit Networking Workshop, J. Evans and T. Buller, Apr. 22, 2001.

The Cambridge Model Distributed System, ACM SIGOPS Operating Systems Review, vol. 14, Issue 1, pp. 21-29, M.V. Wilkes and R.M. Needham, Jan. 1980.

* cited by examiner

DATA PROCESSING SYSTEM WITH MEMORY ACCESS

PRIOR APPLICATION DATA

This application claims priority to U.S. patent application Ser. No. 11/900,377 entitled Data Processing System filed Sep. 10, 2007 which claims priority to PCT Application No. PCT/GB2006/000852 which was published as WO 2006/095184 which is based on and claims priority to Great Britain application number 0504987.9 filed Mar. 10, 2005.

FIELD OF THE INVENTION

This disclosure relates to data processing systems.

RELATED ART

In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. Existing data processing system suffer from various drawbacks in this regard.

In addition, in order to transmit data between data processors in a network such as an Ethernet network, data is formed into packets. Each packet includes a header specifying the destination of the data in the packet. In an Ethernet network the destination is typically specified by means of an Ethernet address, an Internet Protocol (IP) address and a Transmission Control Protocol (TCP) address.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Layers of the stack include an application and a socket provided by a socket library. The socket library is an application program interface (API) for building software applications. The socket library can carry out various functions, including creating descriptors and storing information. Additionally, there is an operating system (OS) comprising a TCP kernel and a proprietary TCP user-level stack.

In order to perform routing the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network. This is a drawback to the prior art.

It is further known that in computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below.

Multiple threads can exist within a single application process and can execute concurrently with access to all the memory of the application context. Thus, there may be multiple threads within each application wishing to access the shared memory. If more than one process or thread were permitted concurrent access to the memory then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory, the lock associated with the memory will enter a locked state, indicating that the memory cannot currently be accessed by other threads. When another thread (T) makes an attempt to access the memory while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space while it is being used can cause an entry to be added to a queue so as to indicate that the threads are awaiting access to the memory. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications.

It is also known for an application, on releasing a lock, to send a system call (syscall) to a driver within the operating system to initiate the sending of a wake-up call to waiting applications. The driver on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

Various embodiments are disclosed herein for overcoming the drawbacks in the prior art and for providing additional advantages and benefits for data processing systems and the methods associated therewith.

SUMMARY

To overcome the drawbacks of the prior art and provide additional benefits and features, a data processing system is disclosed. In one embodiment the system comprises an operating system for supporting processes such that each process is associated with one or more resources. The operating system is arranged to police the accessing by processes of resources so as to inhibit a process from accessing resources with which it is not associated, and being responsive to instructions of a certain type to re-initialize a process. Also part of this embodiment is an interface for interfacing between each process and the operating system. A memory is provided for storing state information for at least one process such that the state information is associated with a resource. In addition, the interface is arranged to analyze instructions from the processes to the operating system, upon detecting an instruction to re-initialize a process so as to be associated with a resource that is associated with pre-existing state information. This causes state information corresponding to that pre-existing state information to be stored in the memory as state information for the re-initialized process and to be associated with the resource.

Also disclosed herein is a data processing system comprising an operating system that stores a first network routing table that comprises one or more entries each indicating at least part of a route over a network to a respective destination. This system also comprises a transmission support function arranged to maintain a copy of the first network routing table and a network data transmission function arranged to transmit data in accordance with the copy network routing table and without accessing the first network routing table.

Also disclosed herein is a data processing system comprising an operating system for supporting processes such that the operating system is arranged to output data by addressing the data to a descriptor corresponding to the intended destination of the data. Also part of this embodiment is an interface for interfacing between each process and the operating system. A memory is provided including one or more address spaces and there is an address space corresponding to each of the processes for use by the respective process. Also, a data communication stack is provided or created for one of the processes such that the stack is located in the address space corresponding to the respective process and having a descriptor allocated to it. In this embodiment, the interface is arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

Also disclosed herein is a method of compiling a data structure in a computer system such that the computer system is arranged to perform protocol processing and transmit data via an interface on the basis of instructions in accordance with a route. In one embodiment this method comprises receiving a first instruction including an indication of a descriptor and determining a route indicated by the first instruction. This method also identifies an interface within the determined route and attempts to determine the ownership of the interface. As a result, this method causes an entry to be made in the data structure such that the entry includes an identifier of the descriptor and a state of the descriptor, wherein the state represents the result of the attempting step.

Also disclosed herein is a data processing system and method arranged to control access by a plurality of processes to a region of shared memory while preventing more than one process from concurrently accessing the region of shared memory. The data processing system may utilize a data structure to hold items of a first type. Each item may comprise an indication of other processes which are attempting to access the region of shared memory, and a defined operation on the region of shared memory. When a process finishes accessing or is permitted to access the region of shared memory, an item in the data structure is actioned by a process, other than the process indicated in that item, performing the defined operation.

Where the process is permitted access to the region of shared memory, the operation may be an operation for storing data in the region of shared memory, and for transmitting data from the region of shared memory.

Where the process is finished accessing the region of shared memory, the data processing system may action the next item in the data structure by causing the operating system to perform the defined operations on the region of shared memory. The operating system may be provided application specific code to enable it to perform at least some of the defined operations. In addition, the next item in the data structure may also be actioned by another process performing the defined operations on the region of shared memory.

In one or more embodiments, the data structure may be accessible by the operating system and at least some of the plurality of processes if desired. The data structure may also be stored in the region of shared memory. Where the data structure is stored in the region of shared memory, it can be made accessible to the operating system and at least some of the plurality of processes. Where the data structure is accessible, the operating system and at least some of the plurality of process may modify the content of the data structure.

The data structure may also be arranged to hold items of a second type. These items may comprise an indication of another process, which is attempting to access the region of shared memory, and an operation to wake the indicated process. Here, when a process finishes accessing the region of shared memory, the data processing system actions an item in the data structure by waking the indicated process. Access to the items of the second type may be restricted by making these items accessible only by the operating system arranged to control the data processing system.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

The embodiments of the invention described herein may include any one or more of the features described in relation to other inventions. As such various different embodiments may be configured with any element, feature, or step, disclosed herein, either alone or in combination.

Figure 1:
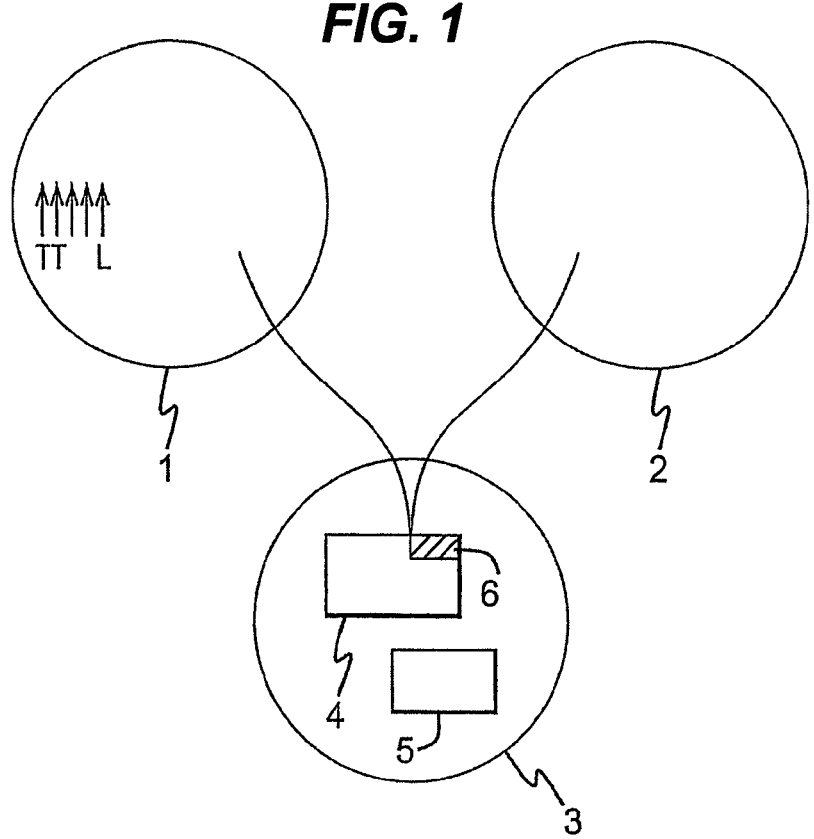
FIG. 1 represents a system including an operating system and applications in communication with the operating system.

This invention relates to the use of shared memory in computer systems, and in particular to controlling access to shared memory in such systems. In computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below. FIG. 1 is a schematic figure showing two different applications 1, 2 which can communicate with state, or memory, 4 controlled by an operating system 3.

Multiple threads can exist within a single application process and can execute concurrently with access to all the memory of the application context. Thus, there may be multiple threads within each application 1, 2 wishing to access the shared memory 4. If more than one process or thread were permitted concurrent access to the memory 4 then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory 4, the lock 6 associated with the memory will enter a locked state, indicating that the memory 4 cannot currently be accessed by other threads. When another thread (T) makes an attempt to access the memory 4 while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space 4 while it is being used can cause an entry to be added to a queue so as to indicate that the threads are awaiting access to the memory. Typically, a thread or application will register its interest in the memory 4 and will subsequently attempt to access it via the lock state 6. The step of registering an interest will cause an entry relating to that thread or application to be made in a queue. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications. This technique can take many forms but one implementation is known as a "condition variable".

It is also known for an application, on releasing a lock, to send a system call (syscall) to a driver within the operating system to initiate the sending of a wake-up call to waiting applications. The driver could, for example, be a user-level transmission control protocol (ULTCP) driver 5. The driver 5, on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

According to a first aspect of the present invention there is provided a data processing system arranged to control access by a plurality of processes to a region of shared memory, the data processing system being arranged to: prevent more than one process from concurrently accessing the region of shared memory; establish a data structure for holding items of a first type each comprising an indication of another of the plurality of processes, which is attempting to access the region of shared memory, and a definition of an operation on the region of shared memory; and on a process finishing accessing the region of shared memory, action an item in the data structure by performing the defined operation by other than the process indicated in that item.

According to a second aspect of the present invention there is provided a data processing system arranged to control access by a plurality of processes to a region of shared memory, the data processing system being arranged to: prevent more than one process from concurrently accessing the region of shared memory; establish a data structure for holding items of a first type each comprising an indication of another of the plurality of processes, which is attempting to access the region of shared memory, and a definition of an operation on the region of shared memory; and on a process becoming permitted to access the region of shared memory, action an item in the data structure by performing the defined operation by other than the process indicated in that item. Preferably the data structure is a lockless data structure. Preferably the operation is one of: an operation for storing data in the region of shared memory; and an operation for transmitting data from the region of shared memory.

Preferably the data structure is further arranged to hold items of a second type each comprising an indication of another of the plurality of processes, which is attempting to access the region of shared memory, and an operation of waking the indicated process; the data processing system being further arranged to, on a process finishing accessing the region of shared memory, action an item in the data structure by waking the indicated process.

Preferably the items of the second type held in the data structure are accessible only by an operating system arranged to control the data processing system. Preferably the data structure is stored in the region of shared memory. Preferably the data structure is accessible by the operating system and at least some of the plurality of processes. Preferably the content of the data structure can be modified by the operating system and at least some of the plurality of processes. Preferably the data structure can be read by the operating system and at least some of the plurality of processes.

Preferably the data processing system is arranged to: on a process finishing accessing the region of shared memory, action the next item in order in the data structure by: if the item is of the first type, performing the defined operations on the region of shared memory by an operating system of the data processing system.

Preferably the data processing system is arranged to: on a process finishing accessing the region of shared memory, action the next item in order in the data structure by: if the item is of the first type, performing the defined operations on the region of shared memory by another of the plurality of processes. Preferably the operating system is provided with application specific code for enabling the operating system to perform at least some of the defined operations.

According to a third aspect of the present invention there is provided a method for controlling access by a plurality of processes to a region of shared memory data in a data processing system, the method comprising: preventing more than one process from concurrently accessing the region of shared memory; establishing a data structure for holding items of a first type each comprising an indication of another of the plurality of processes, which is attempting to access the region of shared memory, and a definition of an operation on the region of shared memory; and on a process finishing accessing the region of shared memory, actioning an item in the data structure by performing the defined operation by other than the process indicated in that item.

According to a fourth aspect of the present invention there is provided a method for controlling access by a plurality of processes to a region of shared memory in a data processing system, the method comprising: preventing more than one process from concurrently accessing the region of shared memory; establishing a data structure for holding items of a first type each comprising an indication of another of the plurality of processes, which is attempting to access the region of shared memory, and a definition of an operation on the region of shared memory; and on a process becoming permitted to access the region of shared memory, actioning an item in the data structure by performing the defined operation by other than the process indicated in that item.

Embodiments of the invention can allow applications to queue in an orderly way for access to the shared memory, and can allow applications to write state to the queue to specify desired future actions. For example, embodiments of the invention can enable an application, when releasing a lock on the memory, to access the queue to identify which applications are waiting for access to the memory, and to select a waiting application to which the lock is to be transferred. For example, a thread L within an application could check the queue when it has completed its use of the shared memory, and select a thread T within the same application and ensure that the lock is passed directly to that thread T in preference to other waiting applications, without the lock being released and without a wake-up call being issued to other waiting applications.

Atomic instructions are an efficient way of creating and modifying a queue in the present situation since they do not themselves require the overhead of lock acquisition. They can be executed fast, in a single processor cycle, and they enable small modifications to be made to a data structure without delay. In a particularly preferred embodiment of the invention, the queue is a compare-and-swap list (CASL). Such a list does not need to be locked while it is being modified. When an application attempts to access the memory while it is locked, the application can register its interest in acquiring the lock and subsequently be added to the bottom of the queue.

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral device must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

Figure 3:
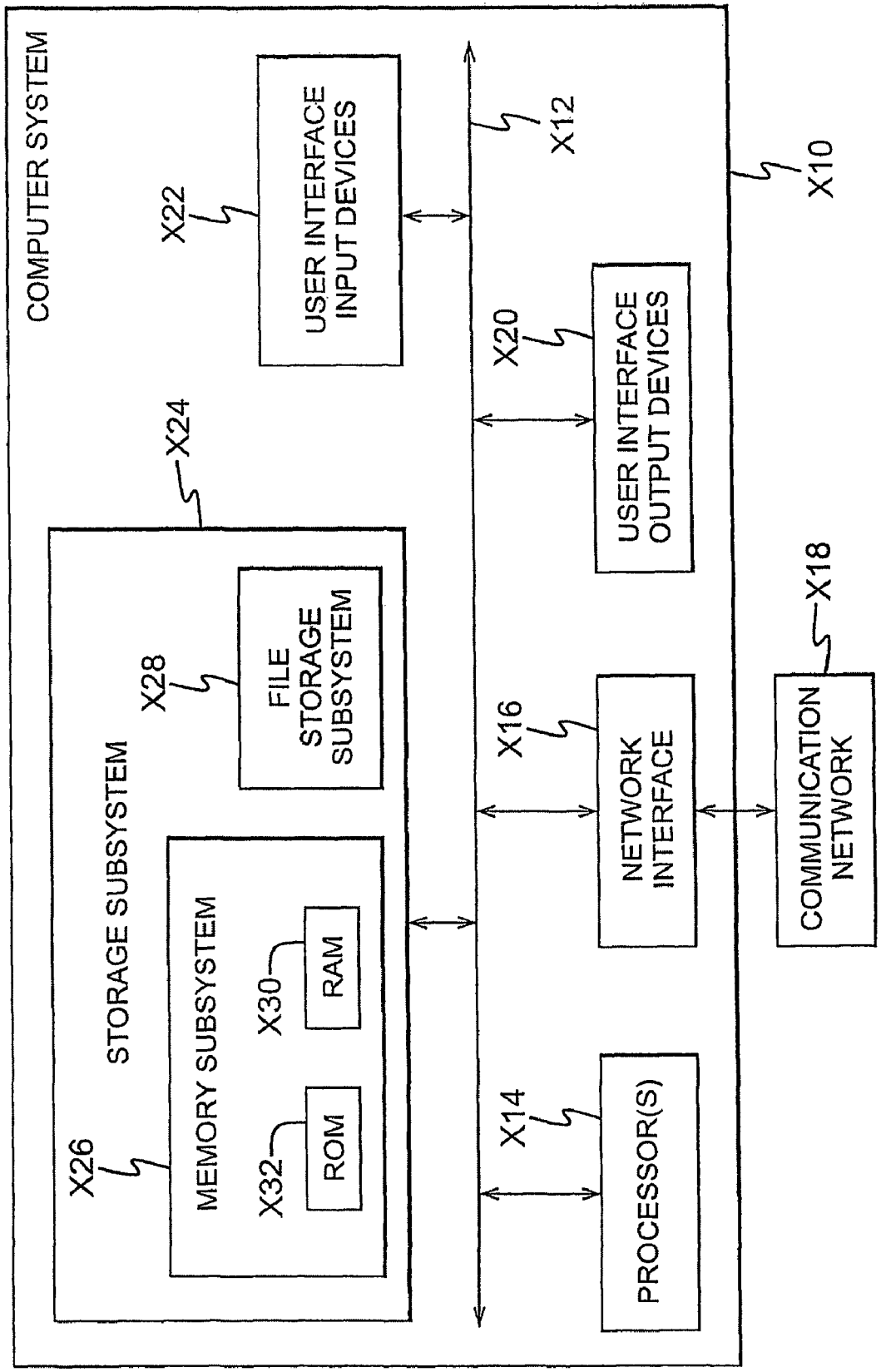
FIG. 3 shows a hardware arrangement suitable for use with embodiments of the invention.

FIG. 3 is a simplified block diagram of a computer system X10 suitable for use with embodiments of the present invention. Computer system X10 typically includes at least one processor X14 which communicates with a number of peripheral devices via bus subsystem X12. These peripheral devices may include a storage subsystem X24, comprising a memory subsystem X26 and a file storage subsystem X28, user interface input devices X22, user interface output devices X20, and a network interface subsystem X16. The input and output devices allow user interaction with computer system X10. Network interface subsystem X16 provides an interface to outside networks, including an interface to communication network X18, and is coupled via communication network X18 to corresponding interface devices in other computer systems. Communication network X18 may comprise many interconnected computer systems and communication links. These communication links may be wireline links, optical links, wireless links, or any other mechanisms for communication of information. While in one embodiment, communication network X18 is the Ethernet, in other embodiments, communication network X18 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices X22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system X10 or onto computer network X18.

User interface output devices X20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system X10 to the user or to another machine or computer system.

Storage subsystem X24 stores the basic programming and data constructs that provide the functionality of certain embodiments of the present invention. For example, the various modules implementing the functionality of certain embodiments of the invention may be stored in storage subsystem X24. These software modules are generally executed by processor X14.

Memory subsystem X26 typically includes a number of memories including a main random access memory (RAM) X30 for storage of instructions and data during program execution and a read only memory (ROM) X32 in which fixed instructions are stored. File storage subsystem X28 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem X28. A host memory contains, among other things, computer instructions which, when executed by a processor subsystem, cause the computer system to operate or perform functions as described herein.

Bus subsystem X12 provides a mechanism for letting the various components and subsystems of computer system X10 communicate with each other as intended. Although bus subsystem X12 is shown schematically as a single bus, alternative embodiments of the bus subsystem may use multiple busses.

Computer system X10 itself can be of varying types including a personal computer, a portable computer, a workstation, a computer terminal, a network computer, a television, a mainframe, or any other data processing system or user device. Due to the ever-changing nature of computers and networks, the description of computer system X10 depicted in FIG. 3 is intended only as a specific example for purposes of illustrating the preferred embodiments of the present invention. Many other configurations of computer system X10 are possible having more or less components than the computer system depicted in FIG. 3.

With reference to the threads and the memory illustrated in FIG. 1, an exemplary series of events in accordance with embodiments of the invention will now be considered. A thread L within the application 1 currently has the lock 6 on shared memory 4 controlled by the operating system 3. A single field in the shared memory comprises: i) the lock; ii) a set of flags; and iii) data. One of the flags indicates whether or not the lock is currently locked. Other flags are used to indicate the presence of outstanding actions, and the data may be used to give details of the actions. Each thread has an associated set of flags, with one flag for each available type of action. This field can be updated atomically by the use of compare-and-swap instructions.

Figure 2:
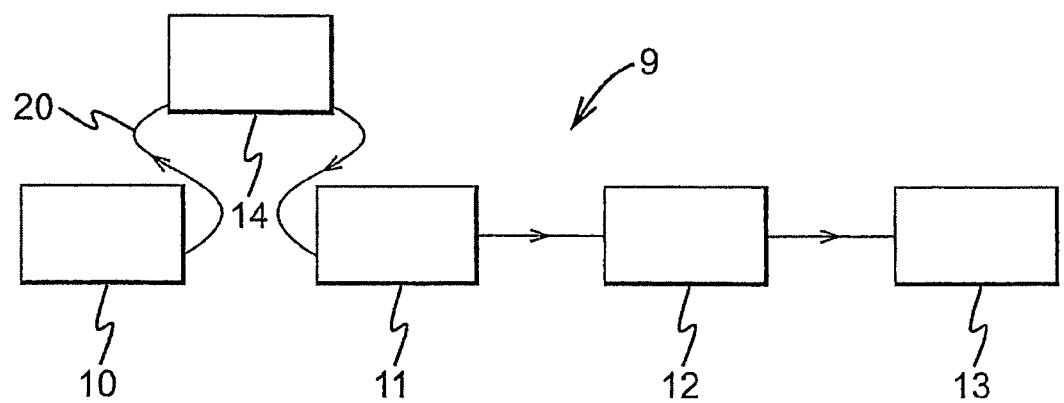
FIG. 2 represents a queue including details of applications waiting to access shared memory.

Additionally, the operating system holds a data structure 9 of processes 10-13 that are waiting for the lock, as shown in FIG. 2. This can suitably be protected by a conventional spin-lock. When the lock is uncontended it is possible to lock and unlock it using a single compare-and-swap instruction. Data relating to the requested actions can be stored in the shared memory of the operating system. System stability concerns mean that the operating system will usually copy out such state into private storage to ensure consistency. This would mean that the callback or action request would have to be registered as part of the system call which requested the wait. If the lock is shared between multiple threads from the same application then it is safer to allow shared state to be accessible between all threads and enable lighter-weight operations to be used to register an interest or callbacks on a lock.

Threads T within the application 1, and a process (which may be a thread or an application) 2, each wish to gain access to the memory 4. Each of these processes independently makes an attempt to access the memory by trying the lock (for example using an atomic instruction). Because L already has access to the shared memory the attempt by T will be unsuccessful. T then registers an interest in the lock. The registering of an interest involves adding an item 10 to the data structure 9 such that the process is identified in the data structure as requiring the lock. Instead of adding an item to the data structure, a previous item associated with the thread or application could be re-used. The data structure is preferably maintained as a bit map which can be atomically updated using compare-and-swap instructions. Alternatively, the data structure could be a CASL (compare-and-swap list). The use of atomic instructions means that the data structure does not need to be locked when it is being written to. It is preferred that the data structure is a lock-free data structure: i.e. that it can be accessed by processes without first being locked in such a way as to prevent access to it by other processes. This is most preferably achieved by it being accessible (optionally exclusively accessible) by means of atomic instructions.

The data structure can include details of the thread attempting to access the memory and an action relating to the thread. The action could be a wake-up call, so that when the memory becomes available a wake-up call is sent to alert the thread. Alternatively the action could be an operation which the thread intended to perform when it acquired the lock, such as transmitting a packet of data. If the data structure is a bit map, it could conveniently be in the form of a table having columns indicating each thread using the operating system and rows indicating the various actions. Thus, if thread T was intending to transmit a packet of data on acquiring the lock, it could create an entry in the bit map indicating a "transmit packet" action against thread T. There could conveniently be a bit allocated for indicating whether or not any threads are blocking while waiting to acquire the lock. This bit can indicate to a releasing thread that it may be required to perform some further action on unlocking.

If the data structure is a CASL, the application could add pointers 20 into the list for specifying a particular type of action or callback 14. For example, a thread T might wish to specify that when the lock is released the memory 4 is to be connected to that thread T and a wake-up is then to be transmitted to the thread. In the meantime, the thread can block, or "go to sleep". Alternatively, the thread T might wish to specify that a particular action is to be performed immediately before the lock is released by the thread L. This could be efficient if the thread T wishes to perform the action but the performance of the action requires the lock to be held. T may not wish to block until the lock is released by L (because that would degrade performance), or it might not be able to block, for example because it is an interrupt service routine. By the use of a callback as described, T can ensure that the action is carried out as soon as possible and without T having to block in the meantime to await the lock.

When the thread L finishes its use of the memory space 4, the list 9 is checked and a decision is made, on the basis of the items in the data structure, how to proceed. The data structure is generally only accessible by the operating system. However, in the case where the lock is shared between threads in the same address space the state comprising the data structure can be visible to all of the threads sharing the lock.

For example, if T has registered an action to transmit a data packet, then when L finishes its use of the memory the data packet will be sent as requested, on behalf of T, without T needing to acquire the lock itself. This can have considerable efficiency savings because once T has registered the action in the data structure it can continue with other operations without needing to make further attempts to acquire the lock in order to send the data packet. The transmission operation could be carried out by the operating system or by the thread L releasing the lock if the releasing thread has the appropriate operability. To enable the operating system to perform the same operations as would ordinarily be performed by threads of an application, code representing relevant application logic could be stored in the operating system. In a further example, the requesting thread T could ask to be woken up while L is still holding the lock, thus implicitly "passing" the lock from L to T.

The arrangement described above could advantageously be applied in an application in which a pair of threads are sharing access to memory space. In such an application, the overhead associated with locking and unlocking can be reduced by instructing one thread to perform the other's work while the first thread holds the lock. An item in the list 9 can include: an identifier of a thread or application; the priority of the application; and an action to be taken when the lock becomes available.

In this example, when the thread L has accessed the queue 9 it decides that another thread within the application 1 is to receive the lock next, and subsequent actions can be carried out either internally within the application or through the operating system 3. In the present example, the thread L decides on the basis of the list 9 that the lock is to be passed directly to one of the threads T within the application 1. The operating system therefore need not be involved in the subsequent actions and the thread L can communicate with the thread T to indicate that it can now obtain the lock.

The subsequent actions could involve waking or alerting processes. The subsequent actions could involve performing certain processing tasks, such as storing specified information in memory, preferably in the shared memory area itself.

If the thread L were instead to decide that the lock was to be passed to a different application, the lock would be passed to the operating system, or more specifically to the kernel within the operating system, which would scan the queue 9 and decide which application should have the lock next. A syscall could then be initiated by the kernel to wake up the appropriate application. It is not essential for an application to decide where the lock should be allocated next—it can simply wake the lock (which will pass the lock to the OS) and the callbacks occur as the lock is released.

In the present example, the lock is passed to one of the threads T. The item in the list 9 relating to the thread T is then deleted or marked as "done" by that thread.

It can be seen that, using embodiments of the present invention, high priority applications can be dealt with quickly in the queueing system, and the lock can efficiently be passed within an application, between applications, and between the OS and another application.

When the OS accesses the queue, it must verify that the instructions are valid and do so in such a manner that any corruption of the instructions during the verification process or in their subsequent execution cannot cause system instability. It therefore checks the validity of pointers and copies the memory.

Different types of callback can be specified. In particular, lock-callbacks and unlock-callbacks can be defined. A lock-callback specifies actions which are to be carried out once a particular process acquires the lock. If a process attempts to obtain a lock and at the same time requests a lock-callback then the attempt will fail. The code will instead execute a slow path involving:

Optionally sleeping until the lock becomes available invoking any requested lock-callbacks once the process has obtained the lock.

Unlock-callbacks cause actions to be carried out when a process finishes with the shared memory and attempts to release the lock. If an unlock-callback has been requested, then when a process finishes with the lock its attempt to unlock, with an atomic instruction, will fail. Instead, the code will execute a slow path involving invoking the requested callbacks and executing an atomic compare-and-swap to clear the callback requests and unlock the lock simultaneously.

If another callback is requested at the same time then the atomic compare-and-swap may fail. In that case, steps 1 and 2 would be performed again until the operation was successful.

It is preferred that callback requests are set using instructions that are atomic with respect to locking and unlocking. This avoids introducing race conditions.

An example will now be considered in which a first process A has the lock on a region of shared memory and a second process B wishes to access the memory. B will attempt to lock, and when it fails (and wishes to wait) it does the following:

Places itself on the queue of processes that are waiting;

Requests a wake-up unlock-callback (if one has not already been requested);

Goes to sleep, awaiting a wake-up call.

Then, when process A wishes to release the lock, it will attempt to unlock. The unlock attempt will fail because an unlock-callback is pending. The slow path will then be executed so that the callback is invoked. A syscall will be executed by process A to ensure that the operating system wakes the process C at the head of the queue of processes that are waiting. Once woken, the process C can then attempt to obtain the lock. If it fails (for example because another process obtained the lock first) then process C will perform steps 1-3 above until it succeeds (or until a timeout or some other error condition).

In addition to the above set of operations, embodiments of the present invention enable actions other than wake-ups to be requested dynamically and atomically. For example, these embodiments can be applied to situations in which a resource needs to be freed, or in which a process is blocked in a TCP/IP stack waiting for some condition. In this latter case, it is necessary that some thread of execution will wake the process when the condition is met. When the process that currently has the lock releases it, and unlock-callback is used to request a notification when the condition is met. The notification may come from some other software process, or from hardware.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A data processing system arranged to control access by a plurality of processes to a region of shared memory, the data processing system being arranged to:
   prevent more than one of the plurality of processes from concurrently accessing the region of shared memory by locking the region of shared memory;
   establish a data structure for holding items of a first type each of the items configured to store a process identifier configured to identify a particular process that has attempted and failed to access the region of shared memory operation to be performed by the particular process on the region of shared memory;
   store a first process identifier for the first process that has attempted and failed to access the region of shared memory, and a first operation intended to be performed by the first process on the region of shared memory, wherein the first process identifier and the first operation are stored in an item of the first type within the data structure; and
   on a second process other than the first process finishing accessing the region of shared memory, read the item and perform the first operation on behalf of the first process with a process other than the first process.

2. A data processing system as claimed in claim 1, wherein the said operation is one of: an operation for storing data in the region of shared memory; and an operation for transmitting data from the region of shared memory.

3. A data processing system as claimed in claim 1, wherein the data structure is further arranged to hold items of a second type each comprising an indication of another of the plurality of processes, which is attempting to access the region of shared memory, and an operation of waking the particular process; the data processing system being further arranged to, on a process finishing accessing the region of shared memory, wake the indicated process.

4. A data processing system as claimed in claim 3, wherein the items of the second type held in the data structure are accessible only by an operating system arranged to control the data processing system.

5. A data processing system as claimed in claim 1, wherein the data structure is stored in the region of shared memory.

6. A data processing system as claimed in claim 5, wherein the data structure can be read by the operating system and at least some of the plurality of processes.

7. A data processing system as claimed in claim 1, wherein the data structure is accessible by the operating system and at least some of the plurality of processes.

8. A data processing system as claimed in claim 7, wherein the content of the data structure can be modified by the operating system and at least some of the plurality of processes.

9. A data processing system as claimed in claim 1, wherein the data processing system is arranged to: on a process finishing accessing the region of shared memory, if the item is of the first type, perform the operation stored in that item on the region of shared memory with an operating system of the data processing system.

10. A data processing system as claimed in claim 9, wherein the operating system is provided with application specific code for enabling the operating system to perform at least the operation.

11. A data processing system as claimed in claim 1, wherein the data processing system is arranged to: on a process finishing accessing the region of shared memory, if the item is of the first type, perform the operation stored in that item on the region of shared memory with another of the plurality of processes.

12. A data processing system as claimed in claim 1, wherein the data structure is a lockless data structure.

13. A data processing system arranged to control access by a plurality of processes to a region of shared memory, the data processing system being arranged to:
   prevent more than one process from concurrently accessing the region of shared memory;
   establish a data structure for holding items of a first type each comprising an identifier of a particular process that is attempting to access the region of shared memory, and an operation intended to be performed by the particular process on the region of shared memory;
   on a process being denied access to the region of shared memory, store an item comprising an identifier of the process and an operation intended to be performed by the process in the data structure; and
   on becoming permitted to access the region of shared memory, read an item in the data structure and perform the operation stored in that item with other than the process identified in that item.

14. A method for controlling access by a plurality of processes to a region of shared memory data in a data processing system, the method comprising:
   preventing more than one process from concurrently accessing the region of shared memory;
   establishing a data structure for holding items of a first type each comprising an identifier of a particular process that is attempting to access the region of shared memory, and an operation intended to be performed by the particular process on the region of shared memory;
   storing the identifier of a first process that is attempting to access the region of shared memory, and an operation intended to be performed by the first process on the region of shared memory in the data structure; and
   on a second process finishing accessing the region of shared memory, reading an item in the data structure and performing on behalf of a process identified in that item the operation stored in that item by other than the process identified in that item.

15. A method for controlling access by a plurality of processes to a region of shared memory in a data processing system, the method comprising:
   preventing more than one process from concurrently accessing the region of shared memory;

establishing a data structure for holding items of a first type each comprising an identifier of a particular process attempting to access the region of shared memory, and an operation intended to be performed by the particular process on the region of shared memory;

storing an identifier of a first process attempting to access the region of shared memory, and an operation intended to be performed by the first process on the region of shared memory; and on a second process becoming permitted to access the region of shared memory, reading an item in the data structure and performing on behalf of a process identified in that item the operation stored in that item by other than the process identified in that item.

16. A data processing system arranged to control access by a plurality of threads to a region of shared memory, the data processing system being arranged to:

prevent more than one thread from concurrently accessing the region of shared memory by means of a lock;

establish a data structure for holding items of a first type each comprising an identifier of a particular thread which is attempting to access the region of shared memory, and an operation intended to be performed by the particular thread on the region of shared memory; and on a first thread finishing its use of the region of shared memory and on determining that the next item in the data structure indicates a second thread belonging to the same application as the first thread, passing the lock to the second thread indicated in that item without unlocking the lock.

* * * * *